United States Patent [19]

Bez et al.

[11] 4,225,153
[45] Sep. 30, 1980

[54] TRANSPORT VEHICLE

[75] Inventors: Ulrich Bez, Gerlingen; Gebhard Ruf, Weissach; Imre Selmeci, Stuttgart; Klaus R. Düwel, Marbach; Herbert Linge, Weissach; Hartmut Holzer, Hemmingen; Volker Munz, Ludwigsburg; Wolfgang Hanisch, Wimsheim; Karl Hauser, Flacht, all of Fed. Rep. of Germany

[73] Assignee: Dr. Ing. H.C.F. Porsche Aktiengesellschaft, Fed. Rep. of Germany

[21] Appl. No.: 859,595

[22] Filed: Dec. 12, 1977

[30] Foreign Application Priority Data

Dec. 10, 1976 [DE] Fed. Rep. of Germany ....... 2655989

[51] Int. Cl.² .............................................. B62D 33/06
[52] U.S. Cl. ................................... 280/788; 280/710; 296/35.1
[58] Field of Search ............. 296/183, 187, 178, 35 A; 280/106.5 R, 709, 710, 788

[56] References Cited

U.S. PATENT DOCUMENTS

| 3,119,503 | 1/1964 | Herpich et al. | 296/35 A X |
| 3,741,329 | 6/1973 | Davis et al. | 296/35 R X |
| 3,948,341 | 4/1976 | Foster | 296/35 R X |
| 3,958,659 | 5/1976 | Selman | 296/35 R X |

Primary Examiner—John J. Love
Assistant Examiner—Michael Mar
Attorney, Agent, or Firm—Craig & Antonelli

[57] ABSTRACT

A transport vehicle which includes a vehicle frame, a vehicle cab or cabin, and a spring support arrangement for supporting the vehicle cab or cabin at the vehicle frame. At least one of a mechanical or hydraulic elevating system is operatively connected at the vehicle cab or cabin and the vehicle frame for enabling a predetermined amount of pivotal movement of the vehicle cab or cabin relative to the vehicle frame in a vertically extending plane. A damping system is operatively connected to the elevating system so as to effect a damping action thereon.

15 Claims, 11 Drawing Figures

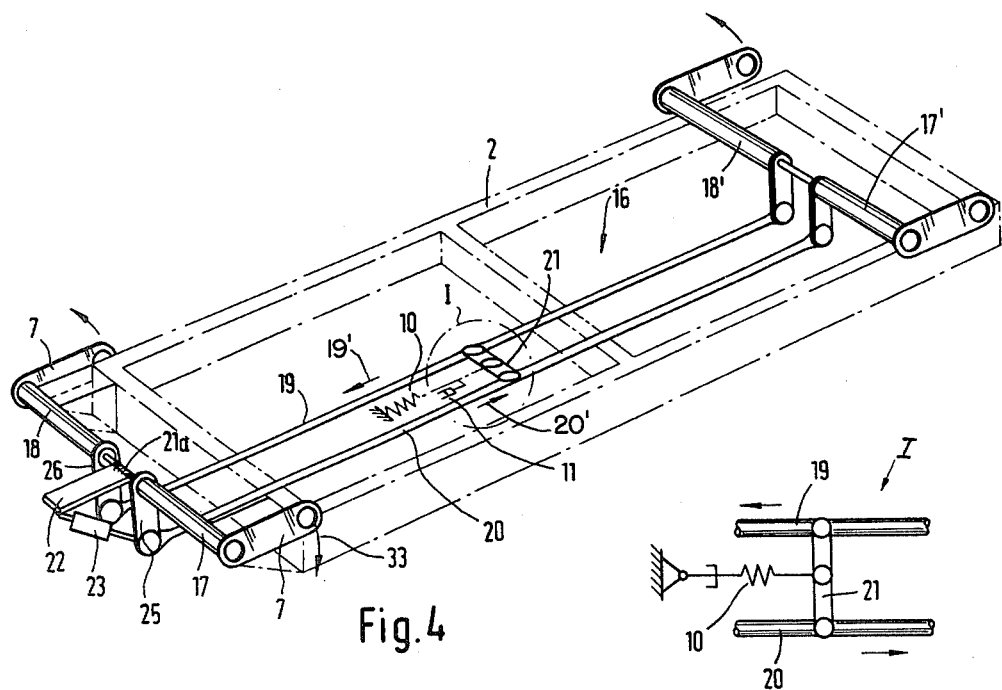
Fig.4
Fig.5
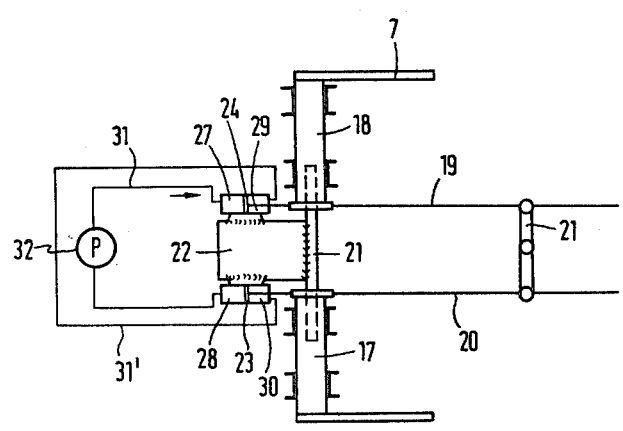
Fig.6
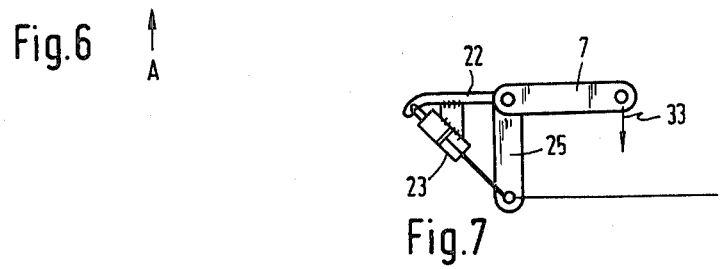
Fig.7

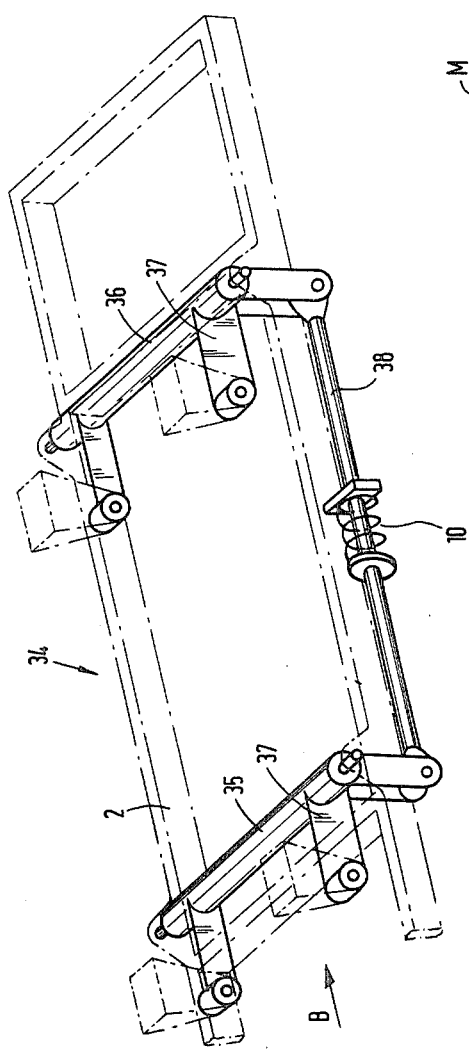
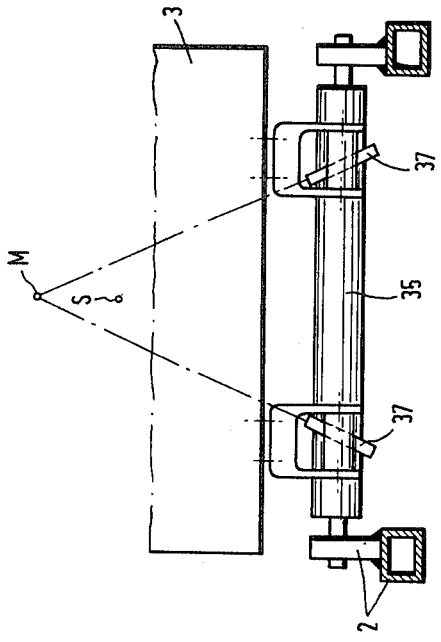

TRANSPORT VEHICLE

The present invention relates to a transport vehicle and, more particularly, to a transport vehicle having a vehicle frame upon which is spring-supported a vehicle cab or cabin.

In vehicles of the afore-mentioned type, the cab or cabin is spring-supported at the side of a vehicle frame by a spring system with such support providing for considerable degrees of freedom of movement depending upon the spring characteristics of the spring system. By virtue of the proposed spring systems at the vehicle frame, the cab or cabin of the vehicle and the passengers therein are subjected to swinging movements which result from, for example, unevenness of the roadway. The swinging movements of the cab or cabin are discomforting for the passengers since the body of the passengers is sensitive to swinging motions.

The disturbing forces such as the swinging movement of the cab or cabin are even more objectionable with certain types of vehicles such as, for example, ambulances, cabin vehicles or vans and similar transport vehicles. For example, in ambulances, the patient is normally lying on a stretcher and is held in a disadvantageous manner in a restless lying condition or position. In addition to these discomforts, the patient is additionally subjected to annoyance or discomfort which arises from the swinging motions of the cab or cabin in various degrees of freedom due to the unevenness of the roadway, as well as the changes in driving conditions occasioned by, for example, braking, acceleration and/or negotiating a curve.

To improve the comfort of patients in ambulances, it has been proposed to provide a spring-supported stretcher in the vehicle cab or cabin. However, the spring-supported stretcher results in the occurrence of relative motion between the physician or medic on the one hand, and the patient on the other hand, thereby rendering the treatment of the patient very difficult.

The aim underlying the present invention essentially resides in providing a transport vehicle having a spring-supported cab or cabin which minimizes, if not avoids, annoying influences on the passengers in the cab or cabin which occur during the driving of the transport vehicle.

According to one advantageous feature of the present invention, a spring system is provided between a vehicle cab or cabin and a vehicle frame with the spring system including a mechanical and/or hydraulic elevating mechanism through which the cab or cabin is freely swingable vertically with respect to the vehicle frame within a certain predetermined range.

According to a further feature of the present invention, the mechanical elevating mechanism includes transverse guide rods spaced from each other and arranged at the frame with the guide rods being swingable or pivotable in the same direction by way of at least one longitudinally extending connecting rod. Each of the transverse guide rods is provided with support arms which normally extend in a longitudinal direction of the transport vehicle. The support arms are provided with pick-ups or mounting portions for mounting and supporting the cab or cabin of the transport vehicle. The at least one longitudinally extending connecting rod is supported in the longitudinal direction of the vehicle by a spring and damping arrangement.

By virtue of the above-noted features of the spring support system and elevating mechanism between the vehicle cabin and vehicle frame, in accordance with the present invention a spring system is created which ensures that the passengers of the transport vehicle have optimum comfort and the transport vehicle is optimally adapted to counteract the swinging motions of the vehicle.

According to another feature of the present invention, the support arms may be constructed as elastically bending members such as, for example, leaf springs which are arranged at an inclination with respect to each other. The leaf springs are arranged adjacent one another so as to form an optimum instantaneous polar moment of rotation of the vehicle cab or cabin, which polar moment is disposed above the center of gravity of the cab or cabin. By this arrangement, aside from a vertical swinging motion of the cab or cabin, a "curve banking effect" is attained, that is, a cab or cabin of, for example, a rescue vehicle or van, when negotiating a curve automatically banks itself into the curve.

In accordance with a still further feature of the present invention, the longitudinally extending connecting rods of the elevating mechanism are divided into a pair of partial connecting rods attached at one end to the respective transverse guide rods with the other ends being attached to each other by way of a rocker arranged, for example, centrally of the vehicle frame so that oppositely directed movement of the longitudinally extending connecting rods results in a vertical swinging of the support arms of the guide rods.

According to yet another feature of the present invention, the transverse guide rods of the elevating mechanism, at respective end areas of the frame, are each divided into partial transverse guide rods and are connected through connecting rods with oppositely arranged partial transverse guide rods by way of a rocker arm supported at the vehicle frame at a position substantially centrally of the frame and the connecting rods. The partial transverse guide rods of at least one side of the vehicle are provided with arms connected with hydraulic cylinders which support themselves on a bracket arranged pivotally between the partial transverse guide rods. The hydraulic cylinders are provided with equal pressure chambers for accommodating a pressure medium and are interconnected with each other. By virtue of this arrangement, it is obtained that, aside from a control of a vertical swinging motion of the cab or cabin, also a "curve banking effect" occurs and the cab or cabin can bank itself into the curve. For this purpose, a conventional sensor may be provided which is operatively connected to a pump provided in the hydraulic system of the hydraulic cylinder, which sensor automatically actuates the pump so as to supply pressure medium to the appropriate hydraulic cylinders so as to automatically cause the cab or cabin to bank itself into the curve.

In accordance with yet a further feature of the present invention, a hydraulic elevating mechanism is provided which includes double-acting hydraulic cylinders, each of which is arranged at respective corners of the vehicle frame with additional spring means being provided between the vehicle frame and the cab or cabin. The double-acting hydraulic cylinders are disposed in a closed hydraulic system with an upper pressure medium chamber of the hydraulic cylinder being in fluid communication with a lower pressure chamber of a diagonally oppositely arranged hydraulic cylinder.

One advantage of the present invention resides in the fact that, by virtue of the provision of the mechanical and/or hydraulic elevating mechanism between the vehicle frame and vehicle cab or cabin, a better driving comfort is obtained than with conventional spring suspensions.

A further advantage of the present invention resides in the fact that any wavering, rolling and tilting is minimized or subdued and is transformed into a vertical swinging motion so that any unpleasant disturbing forces, namely, swinging motion in all degrees of freedom acting on the bodies of the passengers such as, for example, patients in an ambulance, are avoided.

A still further advantage of the present invention resides in the fact that, in addition to the obtaining of vertical swinging motions so as to minimize if not avoid unpleasant disturbing forces, it is also possible to achieve a "curve banking effect" whereby the transverse forces acting on the passengers of the transport vehicle are transformed into normal forces and, for example, a patient lying on a stretcher of an ambulance or rescue vehicle may be held on the stretcher almost free from transverse motions.

Accordingly, it is an object of the present invention to provide a transport vehicle which avoids by simple means the shortcomings and disadvantages encountered in the prior art.

A further object of the present invention resides in providing a transport vehicle such as, for example, wherein unobjectionable supervision and treatment of a patient are readily possible.

Yet another object of the present invention resides in providing a transport vehicle wherein any wavering, rolling, tilting or pitching of the vehicle cab or cabin is transformed into a vertical engaging motion, thereby minimizing any unpleasant disturbing forces acting upon the passengers of the transport vehicle.

A still further object of the present invention resides in providing a transport vehicle which is capable of obtaining a "curve banking effect" so that the vehicle cab or cabin can automatically bank itself when negotiating a curve in a roadway.

These and other objects, features and advantages of the present invention will become more apparent from the following description when taken in connection with the accompanying drawings which show, for the purposes of illustration only, several embodiments in accordance with the present invention, and wherein:

FIG. 4 is a perspective view of a mechanical/hydraulic elevating mechanism in accordance with the present invention;

FIG. 5 is an enlarged detail view of the area designated I in FIG. 4;

FIG. 6 is a top view of the elevating mechanism of FIG. 4;

FIG. 7 is a side view of the elevating mechanism of FIG. 6 taken in the direction of the arrow A;

FIG. 8 is a perspective view of a further embodiment of a mechanical elevating mechanism in accordance with the present invention;

FIG. 9 is a front view of the mechanical elevating mechanism taken in the direction of the arrow B n FIG. 8;

Figure 1:
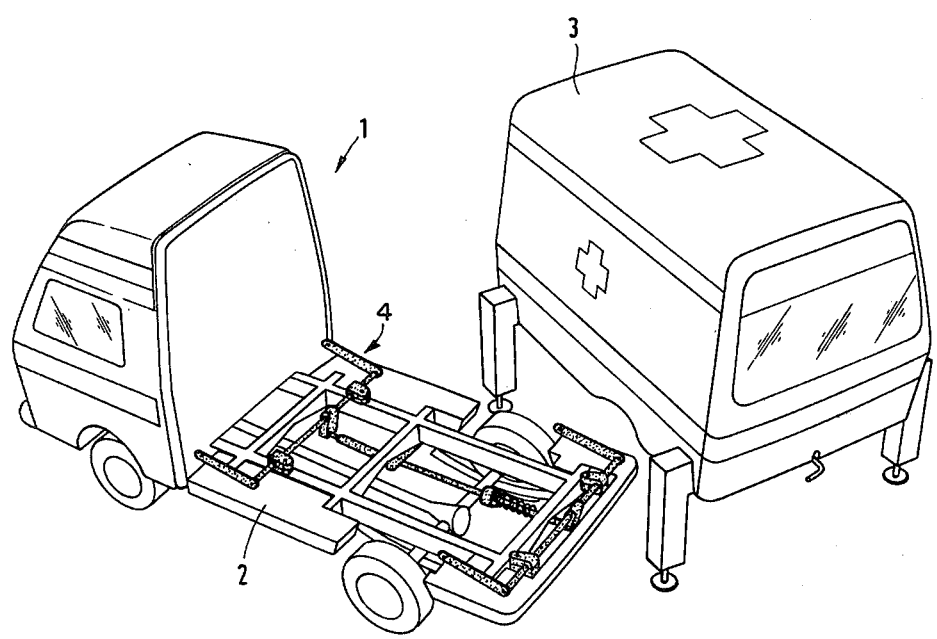
FIG. 1 is a perspective view of a rescue vehicle with a cab or cabin removed therefrom and a mechanical elevating mechanism arranged at the vehicle frame in accordance with the present invention.

Referring now to the drawings wherein like reference numerals are used throughout the various views to designate like vparts and, more particularly, to FIG. 1, according to this figure, a transport vehicle generally designated by the reference numeral 1 is provided with a mechanical elevating mechanism generally designated by the reference numeral 4 arranged between a vehicle frame 2 and a vehicle cab or cabin 3. The mechanical elevating mechanism 4 is constructed as a combination of a spring arrangement and a mechanical and/or hydraulic arrangement cooperating with the spring arrangement.

Figure 2:
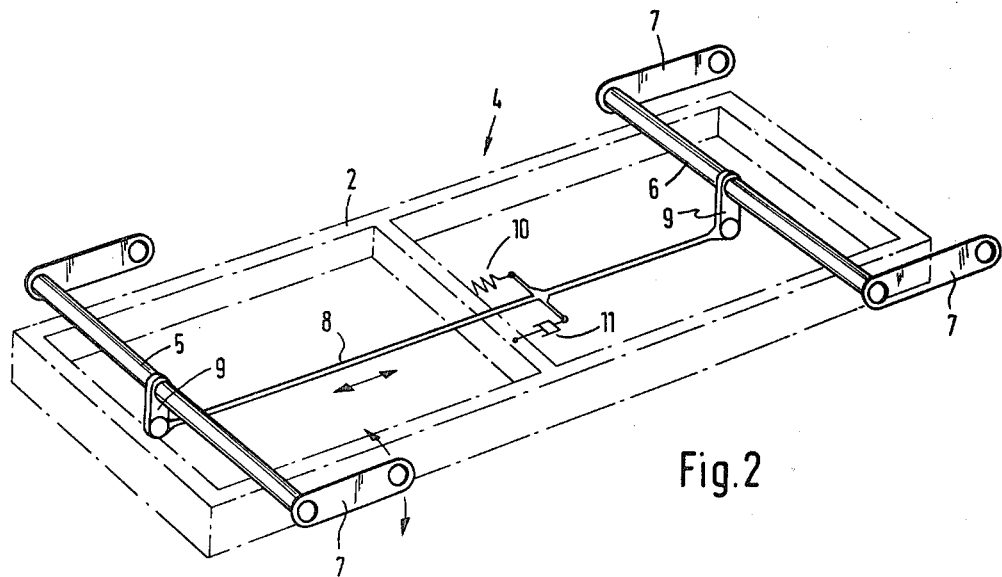
FIG. 2 is a perspective view of a mechanical elevating mechanism in accordance with the present invention.

As shown most clearly in FIG. 2, the elevating mechanism 4 is supported on a frame 2 and includes transverse guide rods 5, 6 having support arms 7 connectable with a vehicle cab or cabin 3. The guide rods 5, 6 are connected with each other by at least one longitudinally extending connecting rod 8 which is pivotally connected and supported at respective ends thereof by levers 9 rigidly connected with the respective guide rods 5, 6. The levers 9 may be integrally formed with the respective guide rods 5, 6 or shrink-fitted thereon. In a hydraulic elevating mechanism, the at least one connecting rod may be connected to hydraulic cylinders of the hydraulic elevating mechanism.

The transverse guide rods 5, 6 are supported at the vehicle frame 2 at a distance from each other with support arms 7 being attached to free ends of the transverse guide rods 5, 6. A spring 10 and damper 11 are connected to the connecting rod 8 and the vehicle frame 2 so as to support the connecting rod 8 for a spring action and a damping action of the longitudinal motion of the connecting rod 8. By virtue of this arrangement, all of the support arms 7 execute or carry out a unidirectional movement in a vertical plane about the longitudinal axis of the respective guide rods 5, 6.

Figure 3:
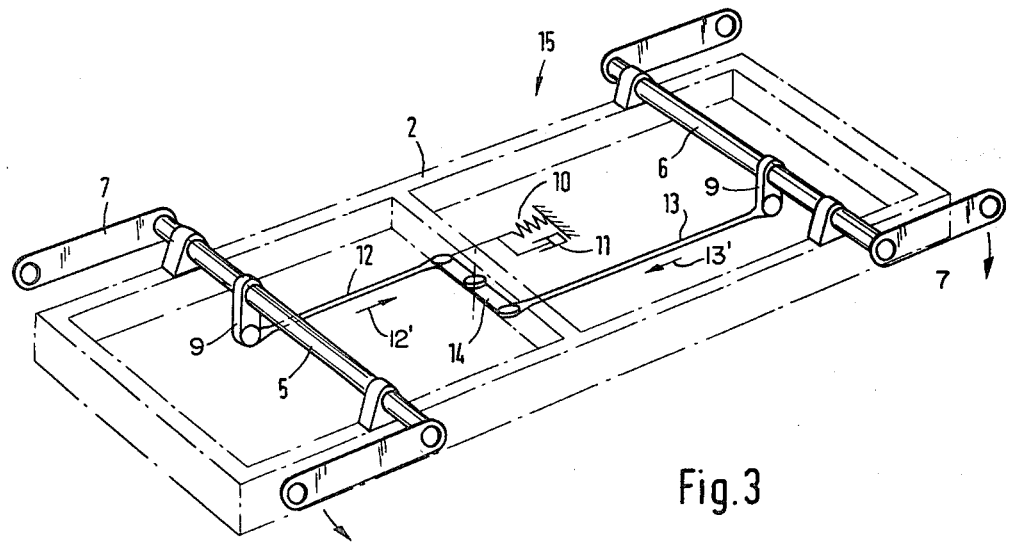
FIG. 3 is a perspective view of a further embodiment of a mechanical elevating mechanism in accordance with the present invention.

As shown in FIG. 3, two longitudinally extending connecting rods 12, 13 are provided with the rods 12, 13 being connected with each other by a rocker arm 14 pivotally mounted at the frame 2. A spring 10 and damper 11 are connected to one end of the rocker arm 14 for providing a spring action and damping action of the movements of the connecting rods 12, 13 and rocker arm 14.

In this last-mentioned construction, the center of gravity of the vehicle cab or cabin is in the middle of the elevating mechanism generally designated by the reference numeral 15 and the frame 2. As readily apparent, by virtue of the provision of the two connecting rods 12, 13 and the rocker arm 14, a displacement of the connecting rods 12, 13 in the direction of the arrows 12', 13' results in the arms 7 being pivoted in a downward direction, whereas a displacement of the connecting rods 12, 13 in an opposite direction results in all of the arms 7 being pivoted upwardly with the pivotal movement of the arms being effected in a vertically extending plane.

FIGS. 4–7 provide examples of mechanical/hydraulic elevating mechanisms by which not only are vertical swinging motions attainable, but also a "curve banking effect" is also attainable in a manner more clearly described hereinbelow.

As shown in FIG. 4, a pair of transverse guide rods 17-18, 17'-18' are provided at each side or end of the vehicle frame 2 with longitudinally extending connecting rods 19, 20 connecting each guide rod 17-18, 17'-18' so as to be pivotable or swingable for rotative movement in the same direction as an opposed transverse guide rod, that is, the guide rods 17-17', 18-18' execute the same rotative motion when the connecting rods 19, 20 are displaced in the direction of the arrows 19', 20' and in opposite directions thereto. A rocker arm 21 is mounted at the frame 2 for pivotally connecting the connecting rods 19, 20 and the guide rods 17, 18, 17', 18'. Rocker arm 21 is provided with a spring 10 and a damper 11 (FIG. 5) for the purposes described hereinabove.

In order to attain "curve banking effect", a shaft 21a is rotatably supported between the pairs of guide rods 17-18 and 17'-18' with a bracket 22 being fastened to the shaft 21a. The bracket 22 serves as an abutment for hydraulic cylinders 23, 24 (FIGS. 6, 7) which are supported at vertical arms 25, 26 rigidly secured to the partial transverse guide rods 17, 18.

As shown most clearly in FIG. 6, the lower cylinder chambers 27, 28 and the upper cylinder chambers 29, 30 are each connected with each other by a hydraulic circuit 31, 31' with a pump 32 being arranged in the inner hydraulic circuit 31. The pump 32 is controllable by a conventional sensor such as, for example, a centrifugal switch (not shown) or a flyweight pendulum (not shown) or the like which senses the centrifugal forces acting upon the cab or cabin 3 and provides an appropriate output signal to the pump 32. Thus, for example, assuming that the cab or cabin 3 tilts in a direction of the side of the hydraulic cylinder 24 provided at the guide rod 18, the hydraulic cylinder 24 is charged or filled with a pressure medium so that the support arms 7 of the guide rods 18, 18' execute an upward swinging motion in a vertical plane. The hydraulic cylinder 23 on the other side of the vehicle cab or cabin 3 then effects swinging motion of the support arms 7 of the guide rods 17, 17' in a downward direction as indicated by the arrow 33 (FIGS. 6, 7) so that the cab or cabin 3 tilts toward the inside of the curve, thereby resulting in a "curve banking effect".

As shown in FIGS. 8 and 9, a mechanical elevating mechanism generally designated by the reference numeral 34 is provided by which a "curve banking effect" is also attainable through mechanical means in addition to the attainment of vertical swinging motions of the support arms. Transverse guide rods 35, 36 are provided at respective ends of the vehicle frame 2 with the guide rods 35, 36 being provided with support arms 37. The support arms 37 are constructed so as to be elastically bendable in a manner similar to a leaf spring. The cab or cabin 3 is supported on the guide rods 35, 36 with the support arms 37, for example, leaf springs, being arranged at an inclination to each other in such a way that, as shown in FIG. 9, an instantaneous polar moment M is created which is disposed above the center of gravity S of the cab or cabin 3.

By virtue of the construction of FIGS. 8 and 9, when the transport vehicle is negotiating a curve on a roadway, the cab or cabin 3, due to the occurrence of moments, is swung toward the inside of the curve, whereby the support arms 37 are twisted. While the longitudinally extending connecting rod 38 between the guide rods 35, 36 is illustrated in FIG. 8 as being arranged outside of the middle or center of the frame 2, it is understood that the connecting rod 38 may also be arranged in the manner illustrated in FIGS. 2, 3 and 4. As with the previous constructions, a spring 10 is provided at the connecting rod 38 with the connecting rod 38 being of a telescopic construction so as to provide for an appropriate damping action of the longitudinal movement of the connecting rod 38.

Figure 10:
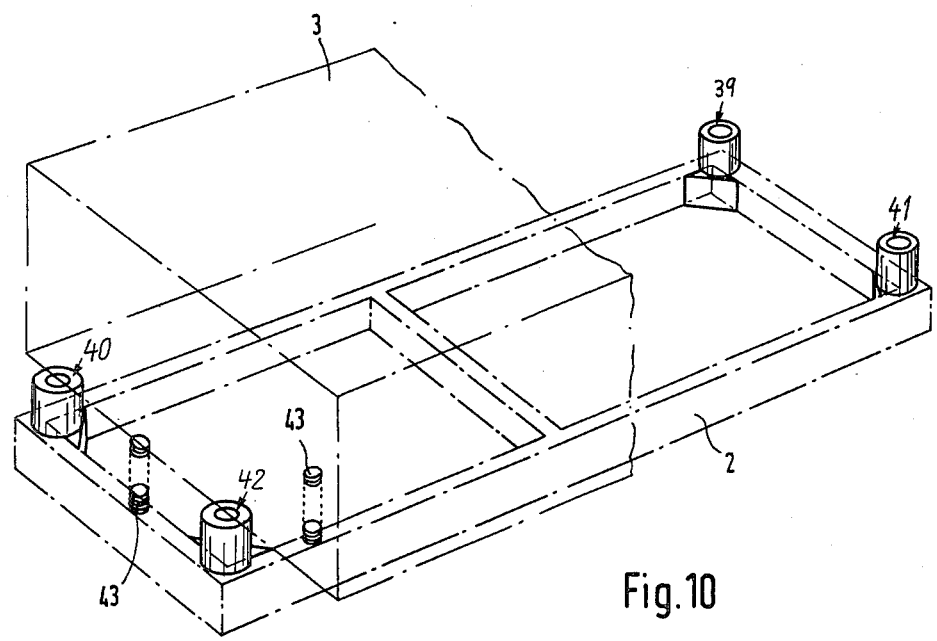
FIG. 10 is a perspective view of a further embodiment of a hydraulic elevating mechanism in accordance with the present invention.
Figure 11:
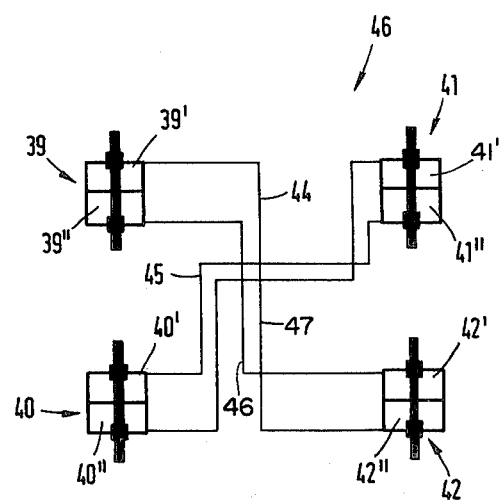
FIG. 11 is a partially schematic view of the hydraulic circuit of the hydraulic elevating mechanism of FIG. 10.

As shown in FIGS. 10 and 11, a hydraulic elevating mechanism generally designated by the reference numeral 46 is provided which includes hydraulic cylinders generally designated by the reference numerals 39, 40, 41, 42 arranged between the vehicle frame 2 and the cab or cabin 3. The hydraulic cylinders 39-42 are arranged at the corners of the frame 2 with the piston rods of the respective hydraulic cylinders 39-42 being supported on the vehicle cab or cabin 3 and the vehicle frame 2 so as to permit a vertical elevating motion of the cab or cabin 3 relative to the vehicle frame 2.

As shown most clearly in FIG. 11, each of the hydraulic cylinders 39-42 includes upper cylinder pressure chambers 39', 40', 41', 42' and lower cylinder pressure chambers 39'', 40'', 41'', 42''. Suitable pressure medium lines or conduits 44, 45, 46, 47 are provided for interconnecting diagonally opposite hydraulic cylinders 39-42 so as to provide for a closed hydraulic system.

The upper cylinder pressure chamber 39' of the hydraulic cylinder 39 is connected with the lower cylinder pressure chamber 42'' of the hydraulic cylinder 42 by the pressure line 44 with the lower cylinder pressure chamber 39'' of the hydraulic cylinder 39 being connected to the upper cylinder pressure chamber 42' of the hydraulic cylinder 42 by the pressure line 46. The upper cylinder pressure chamber 41' of the hydraulic cylinder 41 is connected with the lower cylinder pressure chamber 40'' of the hydraulic 40, while the lower cylinder pressure chamber 41'' of the hydraulic cylinder 41 is connected with the upper cylinder pressure chamber 40' of the hydraulic cylinder 40 by the pressure line 45.

When disturbing forces, occasioned by the vehicle being driven in a curve, act upon the cab or cabin 3, by virtue of the interconnection of the hydraulic cylinders 39-42, it is possible for the cab or cabin to execute controlled upward and downward movements, as shown by the double-headed arrow in FIG. 10.

Additional springs 43 which may be constructed as spiral or leaf springs are arranged between the cab or cabin 3 and the vehicle frame 2 so as to provide appropriate damping action of the cab or cabin 3 relative to the vehicle frame 2.

To cut off or render ineffective the mechanical and hydraulic movements of the elevating mechanisms of the present invention, a suitable arresting means (not shown) may be provided whereby, for example, in the case of a rescue vehicle such as an ambulance driving to an emergency station, the vertical elevating motion of the vehicle cab or cabin with respect to the vehicle frame may be eliminated.

While we have shown and described several embodiments in accordance with the present invention, it is to be understood that the same is not limited thereto, but is susceptible of numerous changes and modifications as would be known to a person skilled in the art to which it pertains, and we therefor do not wish to be restricted to the details shown and described herein, but intend to cover all such changes and modifications as are encompassed by the scope of the appended claims.

We claim:

1. A transport vehicle which includes a vehicle frame, a vehicle cab or cabin, and a spring support means for supporting the vehicle cab or cabin at the vehicle frame, characterized in that at least one of a mechanical and hydraulic elevating means is operatively connected with the vehicle cab or cabin and the vehicle frame for enabling a predetermined amount of pivot movement of the vehicle cab or cabin relative to the vehicle frame in a vertically extending plane, the mechanical elevating means includes at least a pair of spaced guide members rotatably arranged at the vehicle frame so as to extend transversely of a longitudinal axis of the vehicle frame, at least one connecting means is provided and extends in a longitudinal direction of the vehicle frame for connecting said guide members to each other, and in that means are operatively connected with the elevating means for effecting a damping action thereon.

2. A transport vehicle according to claim 1, characterized in that a plurality of support arm means are provided at each of said guide members for supporting the vehicle cab or cabin with one of said plurality of support arm means being arranged at a first end area of each of said guide members and another of said plurality of support arm means being arranged at a second end area of each of said guide members, each of said support arm means normally extending in a longitudinal direction of the vehicle frame, and in that receiving means are provided on each of the support arm means for enabling a mounting of the vehicle cab or cabin at respective support arm means.

3. A transport vehicle according to claim 2, characterized in that each of said support arm means is constructed as a leaf spring with the leaf springs of respective guide members being arranged at an inclination to each other such that an optimum instantaneous polar moment of the vehicle cab or cabin is defined at a position above a center of gravity of the vehicle cab or cabin.

4. A transport vehicle according to claim 2, characterized in that the at least one connecting means includes two connecting members, a first of said connecting members having a first end connected to one of said guide members and a second free end, a second of said connecting members having a first end connected to the other of said guide members and a second free end, and in that rocker means are arranged at the vehicle frame and are operatively connected to the second free ends of the connecting members for permitting oppositely directed movement of the two connecting members.

5. A transport vehicle according to claim 2, characterized in that each of said pair of spaced guide members includes a first and second guide rod rotatably mounted at the vehicle frame, at least two connecting means are provided for connecting each of said first guide rods to each other and each of said second guide rods to each other, and in that a rocker means is arranged at the vehicle frame and is operatively connected with the connecting means for enabling the two connecting means to move in opposite directions.

6. A transport vehicle according to claim 5, characterized in that both the mechanical and hydraulic elevating means are provided, and in that each of said first and second guide rods are provided with arms spaced from said support arm means, a bracket means is pivotally arranged between the first and second guide rods of at least one of said pair of spaced guide members, and in that the hydraulic elevating means includes a hydraulic cylinder piston means interposed between said bracket means and each of the last-mentioned guide rods for enabling a predetermined rotary displacement of the guide rods, and in that means are operatively connected with the hydraulic cylinder piston means for controlling a flow of a pressure medium to said hydraulic cylinder piston means.

7. A transport vehicle according to claim 6, characterized in that each of said hydraulic cylinder piston means includes upper and lower pressure chamber means for accommodating a quantity of a pressure medium, and in that said controlling means includes a hydraulic circuit means for interconnecting the upper pressure chambers of each of said hydraulic cylinder piston means to each other and for interconnecting the lower pressure chambers of each of said hydraulic cylinder piston means to each other.

8. A transport vehicle according to claim 7, characterized in that the controlling means further includes a pump means for pumping a pressure medium, said pump means being arranged in a portion of the hydraulic circuit means interconnecting the lower pressure chambers of the hydraulic cylinder piston means.

9. A transport vehicle according to claim 8, characterized in that means are provided for sensing centrifugal forces acting upon the vehicle cab or cabin and for providing an output signal to said pump means so as to control an operation thereof.

10. A transport vehicle according to claim 1, characterized in that each of said pair of spaced guide members includes a first and second guide rod rotatably mounted at the vehicle frame, at least two connecting means are provided for connecting each of said first guide rods to each other and each of said second guide rods to each other, and in that a rocker means is arranged at the vehicle frame and is operatively connected with the connecting means for enabling the two connecting means to move in opposite directions.

11. A transport vehicle according to claim 10, characterized in that both the mechanical and hydraulic elevating means are provided, and in that each of said first and second guide rods are provided with arms spaced from said support arm means, a bracket means is pivotally arranged between the first and second guide rods of at least one of said pair of spaced guide members, and in that the hydraulic elevating means includes a hydraulic cylinder piston means interposed between said bracket means and each of the last-mentioned guide rods for enabling a predetermined rotary displacement of the guide rods, and in that means are operatively connected with the hydraulic cylinder piston means for controlling a flow of a pressure medium to said hydraulic cylinder piston means.

12. A transport vehicle according to claim 11, characterized in that each of said hydraulic cylinder piston means includes upper and lower pressure chamber means for accommodating a quantity of a pressure medium, and in that said controlling means includes a hydraulic circuit means for interconnecting the upper pressure chambers of each of said hydraulic cylinder piston means to each other and for interconnecting the lower pressure chambers of each of said hydraulic cylinder piston means to each other.

13. A transport vehicle according to claim 12, characterized in that the controlling means further includes a pump means for pumping a pressure medium, said pump means being arranged in a portion of the hydraulic circuit means interconnecting the lower pressure chambers of the hydraulic cylinder piston means.

14. A transport vehicle according to claim 13, characterized in that means are provided for sensing centrifugal forces acting upon the vehicle cab or cabin and for providing an output signal to said pump means so as to control an operation thereof.

15. A transport vehicle according to claim 1, characterized in that the at least one connecting means includes two connecting members, a first of said connecting members having a first end connected to one of said guide members and a second free end, a second of said connecting members having a first end connected to the other of said guide members and a second free end, and in that rocker means are arranged at the vehicle frame and are operatively connected to the second free ends of the connecting members for permitting oppositely directed movement of the two connecting members.

* * * * *